United States Patent [19]

Saeger

[11] Patent Number: 5,574,512
[45] Date of Patent: Nov. 12, 1996

[54] MOTION ADAPTIVE VIDEO NOISE REDUCTION SYSTEM

[75] Inventor: Timothy W. Saeger, Indianapolis, Ind.

[73] Assignee: Thomson Consumer Electronics, Inc., Indianapolis, Ind.

[21] Appl. No.: 290,419

[22] Filed: Aug. 15, 1994

[51] Int. Cl.$^6$ ........................................................ H04N 5/21
[52] U.S. Cl. ............................................. 348/620; 348/607
[58] Field of Search .................................. 348/620, 619, 348/618, 622, 607, 621, 606, 669, 670, 666, 667, 623, 627, 610, 701, 241, 625, 628; 358/336, 340; 375/34, 100, 103, 254, 347, 350; 455/63; 382/262, 261, 275; H04N 5/213, 5/21

[56] References Cited

U.S. PATENT DOCUMENTS

| 4,194,219 | 3/1980 | Drewery | 348/620 |
|---|---|---|---|
| 4,246,610 | 1/1981 | Takahashi | 358/167 |
| 4,926,361 | 5/1990 | Ohtsubo et al. | 348/607 |
| 5,130,798 | 7/1992 | Christopher | 358/140 |
| 5,166,794 | 11/1992 | Tanaka | 348/607 |
| 5,185,664 | 2/1993 | Darby | 348/620 |
| 5,327,241 | 7/1994 | Ishizu et al. | 348/606 |

FOREIGN PATENT DOCUMENTS

| 0531818 | 3/1993 | European Pat. Off. | H04N 5/21 |
|---|---|---|---|
| 62-208764 | 9/1987 | Japan | H04N 5/21 |
| 2251353 | 7/1992 | United Kingdom | H04N 5/213 |

OTHER PUBLICATIONS

Wischermann, Gerhard "Median Filtering of Video Signals–A Powerful Alternative", SMPTE Journal, Jul. 1991, pp. 541–546.

Primary Examiner—Safet Metjahic
Attorney, Agent, or Firm—Joseph S. Tripoli; Peter M. Emanuel; Richard G. Coalter

[57] ABSTRACT

A subtractor (106) forms a difference signal (D) from a video input signal (C) and a further signal (M) supplied thereto. The difference signal is limited (108) and attenuated (110) and the resultant signal (F) is combined (112) with the video input signal for providing a noise reduced video output signal (H). A delay circuit (202), responsive to the video output signal, provides field (A) and frame (B) delayed video signals. A selection circuit (220) selects a median value (M) of the field delayed video signal, the frame delayed video signal and the video input signal as the further signal for application to the subtractor. Advantageously, the further signal provides the dual functions of (1) facilitating the noise reduction of the output signal and (2) concurrently reducing the occurrence of potential motion artifacts to a very substantial degree.

14 Claims, 2 Drawing Sheets

MOTION ADAPTIVE NOISE REDUCTION SYSTEM 200

MOTION ADAPTIVE VIDEO NOISE REDUCTION SYSTEM

FIELD OF THE INVENTION

This invention relates to temporal video noise reduction systems, generally, and particularly to video noise reduction systems of the type employing motion adaptive processing.

BACKGROUND OF THE INVENTION

Frame recursive filters have been found to be effective in improving the signal-to-noise ratio of video signals having little or no frame-to-frame motion. Such filters are based on the principle that for still images, or those having little motion, there is a high correlation of picture element values from frame-to-frame whereas the noise (for still images) is relatively incoherent and exhibits little correlation from frame to frame. Accordingly, by combining a number of frame delayed signals, the signal power of the sum will increase more quickly than the noise power and the signal-to-noise ratio will increase.

Obtaining multiple frame delayed video signals may be achieved by feedback in so-called "recursive" noise reduction systems. FIG. 1 herein is an example of such a system. The noise reduction system 100 of FIG. 1 includes an input terminal 102 for receiving a video input signal to be noise reduced and an output 104 for providing a noise reduced video output signal. Input 102 is coupled via a subtractor 106, a limiter 108, an attenuator 110 and an adder 112 to the output 104. The input 102 is also applied to the adder 112 and the adder output is feedback to the subtractor 106 via a frame delay unit 114.

In operation, a noisy video input signal S1 (at terminal 102) and a frame delayed noise-reduced video output signal S3 from unit 114 are combined in subtractor 106 to produce a frame difference signal S4. The frame difference signal S4 provides an estimate of the amount of noise in the input signal S1 for still images. For moving images, it represents frame-to-frame motion plus noise. To reduce the visual artifacts produced for moving pictures to an "acceptable" minimum level, difference signal S4 is limited in limiter 108 to relatively low levels (e.g., a few IRE units). Providing a larger limiting threshold will increase the effective noise reduction but increase the artifacts caused by scene motion. Accordingly, limiting values are generally selected as a compromise between the desired noise reduction and the acceptable level of motion artifacts.

The output of the limiter 108 is then reduced (attenuated) in attenuator 110 by some small amount (a reduction of ⅛th or a transmission of ⅞ths) so that transients of the system will eventually decay to zero. Advantageously, the attenuation ensures convergence and stability of the feedback system. Finally, the reduced output of the limiter S5 is attenuated in attenuator 110 and is added, as signal S6 in adder 112, back to the current input signal S1 thus canceling a portion of the noise content of the input signal S1. The resultant "noise reduced" signal S2 is fed back to the frame delay to be used on the next frame and thus completing the recursive signal path.

As described above, the general form of recursive noise reduction provides excellent results for still (or nearly stationary) images because of the high correlation (coherence) of picture element values from frame to frame whereas the noise is relatively uncorrelated on a frame to frame basis. For moving pictures, however, the difference signal S4 represents motion as well as noise and limiting at a relatively low level is required to minimize the visual artifacts caused by the motion component of the difference signal. Generally speaking, however, in certain applications limiting the difference signal in a frame recursive noise reduction system may not be enough to suppress the motion artifacts to an acceptable minimum level and additional motion compensation may be called for and various approaches to this problem have been proposed.

One way to reduce the effect of motion artifacts in a frame recurslye noise reduction system is to split the video band into two portions, apply frame recursive noise reduction to the lower frequency portion and apply another form of noise reduction to the higher frequency portion. Such a system is described by Christopher in U.S. Pat. No. 5,130,798 entitled DUAL BAND PROGRESSIVE TELEVISION SYSTEM WITH NOISE REDUCTION, which issued Jul. 14, 1992.

Advantageously, the "dual band" approach both reduces the system memory requirements and confines transient artifacts to low frequency luminance signals only. On the other hand, relatively complex circuitry is required for the band splitting and separate noise reduction processing functions.

Another approach to reducing the effect of motion artifacts in a frame recursive noise reduction system is described by Takahashi in U.S. Pat. No. 4,246,610 entitled NOISE REDUCTION SYSTEM FOR COLOR TELEVISION SIGNAL, which issued Jan. 20, 1981. The Takahashi approach includes bypassing the frame recursive filter for scenes containing high motion. To this end a motion dependent switch is provided (known generally as a "soft switch") which "blends" the incoming video signal with the noise reduced video signal as a function of the motion indicating signal. For still images the switch selects the noise reduced signal, for moving images the switch selects the original signal (with no noise reduction) and for images having relatively low motion the signals are proportionately "blended" as a function of the motion (frame difference) signal. Although such an approach is effective in reducing motion artifacts in the case of moving images, it also eliminates the noise reduction.

A further problem with the "blending" type of "motion adaptive" noise reduction system is that the action of the soft switch itself may produce visual artifacts for certain scenes due, for example, to motion detection errors. For example, large amounts of noise in a still image may be erroneously interpreted as motion in the scene. If so, the soft switch will erroneously reduce the frame recursive filtering component thus reducing the noise reduction when, in fact, there is no reason to do so.

SUMMARY OF THE INVENTION

It is herein recognized that a need exists for a motion adaptive frame recursive video noise reduction system having reduced motion related visual artifacts. A need exists further for a motion adaptive noise reduction system which does not require restriction of the noise reduction bandwidth. A further need exists for a motion adaptive noise reduction system which does not rely on motion dependent "blending" as previously discussed. The present invention is directed to meeting all of these needs.

Apparatus, embodying the invention, for providing video noise reduction, comprises a subtractor for forming a difference signal from a video input signal and a further signal supplied thereto. The difference signal is limited and attenuated and the resultant signal is combined with the video input signal to provide a noise reduced video output signal. A delay circuit, responsive to the video output signal, provides field and frame delayed video signals. A selection circuit selects one of the field delayed video signal, the frame delayed video signal and the video input signal as the further signal for application to the subtractor for both facilitating the noise reduction and concurrently suppressing potential motion related artifacts.

In a preferred application of the principles of the invention, the selection circuit comprises a median filter to which the field delayed video signal, the frame delayed video signal and the video input signal are applied and the output of which provides the further signal.

A method of providing noise reduction, in accordance with the invention, comprises forming a difference signal from a video input signal and a further signal; limiting and attenuating the difference signal; combining the limited and attenuated difference signal with the video input signal to form a video output signal; delaying the video output signal by one field and by one frame; and selecting the further signal from among (i) the field delayed video output signal, (ii) the frame delayed video output signal and (iii) the video input signal.

In accordance with a further feature of the method of the invention, the step of selecting the further signal comprises subjecting the video input signal, the field delayed video output signal and the frame delayed video signal to median filtering, the median value thereof being used as the further signal for forming the difference signal.

BRIEF DESCRIPTION OF THE DRAWING

The foregoing and further features of the invention are shown in the accompanying drawing, wherein like elements are denoted by like reference characters, and in which.

DETAILED DESCRIPTION

Figure 1:
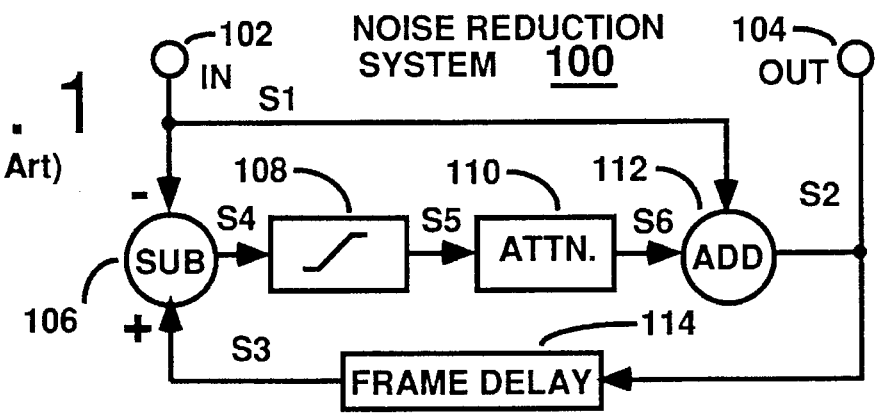
FIG. 1 is a block diagram of a known recursive video noise reduction system.
Figure 2:
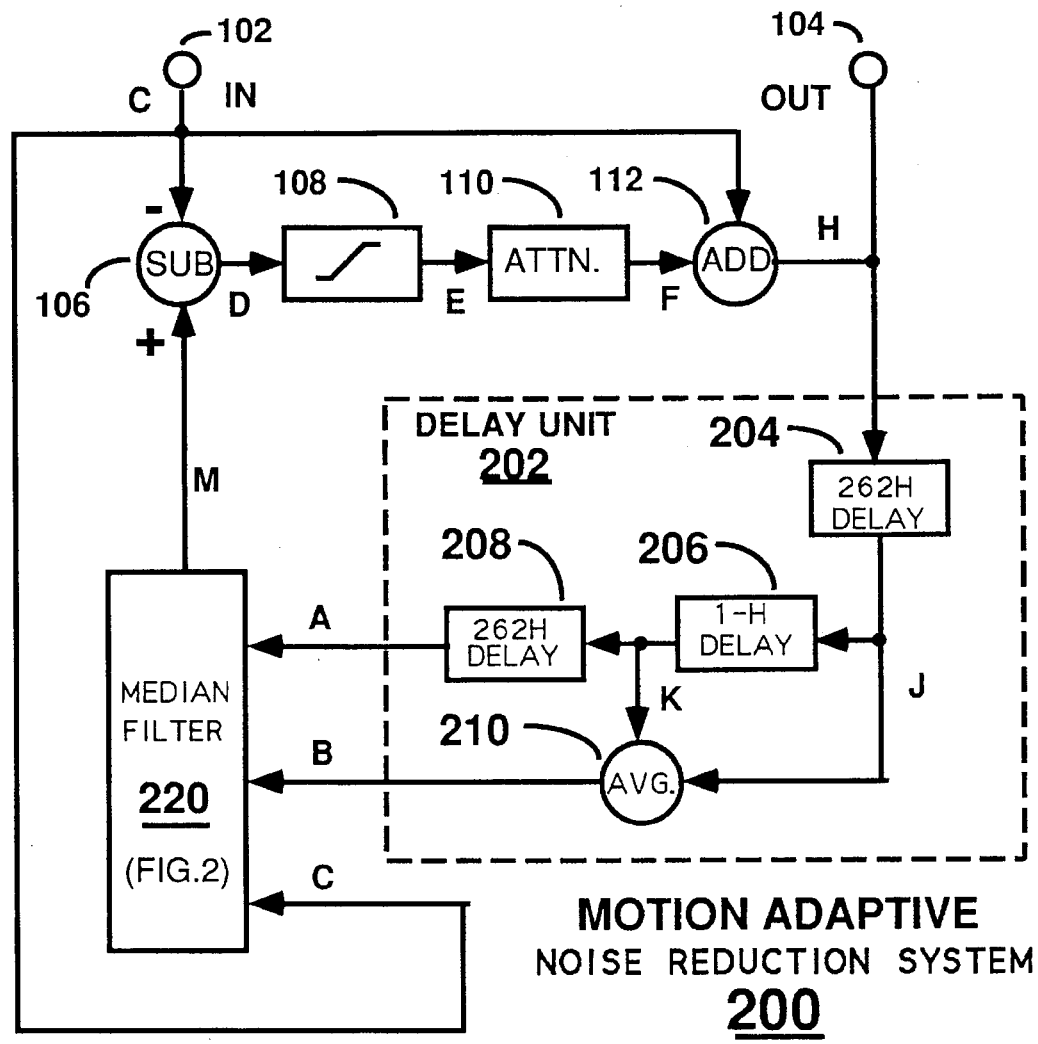
FIG. 2 is a block diagram of motion adaptive recursive video noise reduction system embodying the invention.

The motion adaptive video noise reduction system 200 of FIG. 2 includes an input terminal 102 for receiving a video input signal "C" to be noise reduced and an output terminal 104 for providing a noise reduced video output signal "H". A subtractor 106 forms a noise representative difference signal D from the video input signal "C" and a further signal "M" supplied thereto. The difference signal "D" is limited by a limiter 108 and attenuated by an attenuator 110 and the resultant limited and attenuated difference signal "F" is combined with the video input signal "C" in an adder 112 to effectively "cancel" the noise component of signal "C" and thereby produce the noise reduced video output signal "H". As an aside, it will be noted that the order of the limiting and the attenuation is of no consequence. Limiting may be applied first (as shown), attenuation may be applied first or both limiting and attenuation may be applied concurrently in a common circuit configuration.

In accordance with the invention, the signal "M" is derived from the input and output signal signals "C" and "H" of the system 200 so as to provide both noise reduction and motion artifact reduction. In this embodiment of the invention, the formation of the signal "M" is provided by a delay unit 202, responsive to the video output signal "H", which provides a frame delayed video signal "A" and a field delayed video signal "B". A selection circuit 220 (illustrated here as a median filter) selects one of the frame delayed video signal "A", the field delayed video signal "B" and the video input signal "C" as the further signal "M" for application to the subtractor 106.

More specifically, the median filter 220 selects the median of the signals "A", "B" and "C" as the further signal "M" for subtractor 106. The term "median" as used herein has its usual mathematical meaning as distinguished from the "average". As an example, the median (or in-between value) of the set of values "1, 2, 9" equals 2 whereas the average is 4. As another example, the median of the set "1, 4, 4" equals 4 whereas the average would be 3. For a three input median filter, the median is that value lying within a range defined by the maximum and minimum values of the three input signals.

Figure 3:
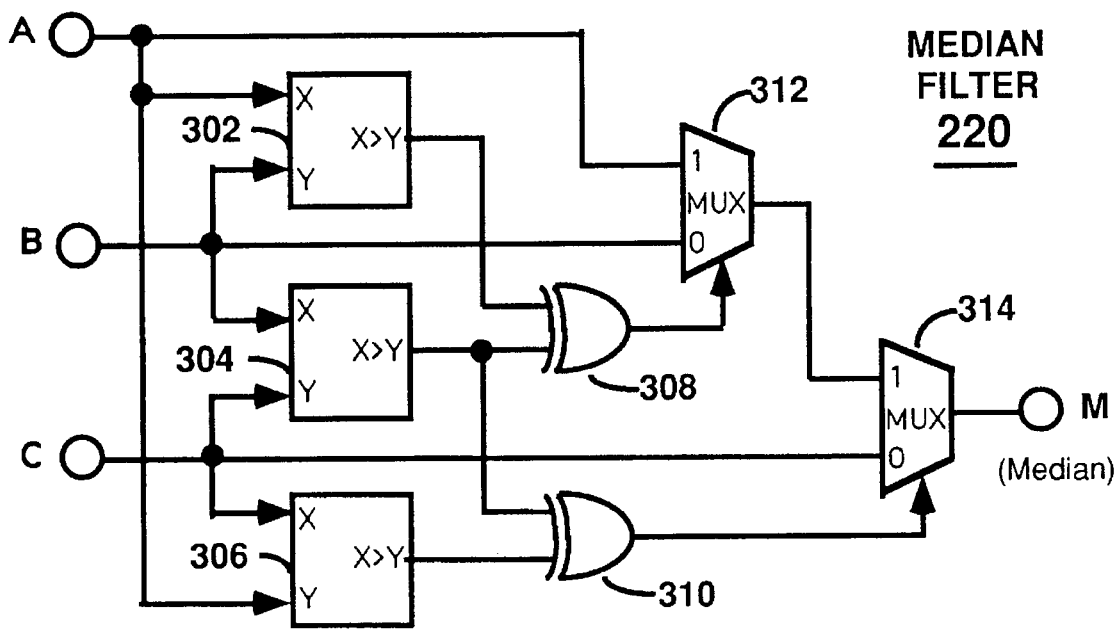
FIG. 3 is a block diagram of a three-input median filter suitable for use in the motion adaptive recursive video noise reduction system of FIG. 2.

In more detail, for the three input median filter shown, the filter selects the video input signal "C" as the further signal "M" when the video input signal is within a range bounded by the field delayed video output signal "B" and the frame delayed video output signal "A". In other words, "C" will be taken as the median if it is not greater than the largest of "A" and "B" and it also is not smaller than the lesser of "A" and "B". If "C" thus exceeds the minimum and maximum values defined by "A" and "B", then "C" can not be the median and one of the other values must be. To continue, the median filter 220 selects the field delayed video output signal "B" as the further signal "M" when the field delayed video output signal "B" is within a range bounded by the video input signal "C" and the frame delayed video output signal "A". Lastly, filter 220 selects the frame delayed video output signal "A" as the further signal "M" when the frame delayed video output signal "A" is within a range bounded by the video input signal "C" and the field delayed video output signal "B". Finally, in the case where any two of the signal values are identical and of equal value, such as "x" IRE units, then the median (for a three input median filter) will equal "x" regardless of the value of the third signal. FIG. 3, discussed later, provides a detailed block diagram of a suitable implementation of the median filter 220.

The delay unit 202, as noted above, provides the frame and field delayed signals "A" and "B" to two inputs of the median filter 220. For purposes of the present invention it is desirable that the field delayed video signal "B" be spatially aligned with the frame delayed video signal. Due to interlace, however, there is no pixel a field earlier which is in alignment with a pixel of a current field since there is a half-line shift from field to field. Since no spatially coincident pixel exists in a previous field, delay unit 202 derives the desired signal from the video output signal "H" by means of interpolation.

In accordance with a further feature of the invention, it has been found that the use of linear two-point interpolation for generating the field delayed signal "B" provides satisfactory results in meeting the dual objects of both providing noise reduction and providing motion artifact reduction. Performance may suffer if a lower order of interpolation is employed, such as linear one-point interpolation where pixels are estimated by repeating the value of one pixel a field earlier. Such an interpolation technique results in a field-delayed pixel that is vertically offset from a current pixel rather then being spatially coincident as is desired for purposes of the present invention. As an alternative, one may provide a higher level of interpolation, if desired, by using more than two points and the estimation may be done with other than by "straight line" calculations (e.g., parabolic or other curved estimation functions may be suitable).

Considering now the details of delay unit 202 and the two-point linear interpolation discussed above, unit 202 comprises a cascade connection of a first delay element 204 which delays the video signal "H" by one field less one half of a line. This delay corresponds to 262 lines in the 525 line NTSC system or 312 lines in the PAL 625 line system. The delayed signal "J" is delayed by one additional line (I-H) in the delay element 206 and the resultant delayed signal "K" is delayed again by one field less one half line (262 lines or 312 lines as noted above) in a delay element 208 to provide the frame delayed video signal "A". The field delayed video signal "B" is obtained by two point linear interpolation provided by an averager 210 which forms the average of the delayed signals "J" and "K". As noted above, the process of interpolation from the delayed signals shown produces pixels (i.e., picture elements) of the interpolated (averaged) signal "B" which are spatially aligned with pixels of the current and frame delayed video signals but temporally displaced by one field. In other words, the signal "B", represents the averaged or interpolated value of vertically adjacent pixels in a previous field which are immediately above and immediately below the location of a given pixel of a current given field. Repeating the foregoing caveat, using fewer than two points for the interpolation may result in less than optimum performance. More points may be used in the interpolation at the cost of increased complexity. It has been found that two point linear interpolation is preferred as being optimum in terms of both cost and performance for the reasons discussed above.

In operation of the overall system of FIG. 2, the selection circuit (i.e., median filter) 220 selects the median of a pixel from the current field (C), a pixel having the same spatial position averaged from pixels above and below of the previous field (B) and a pixel taken from the previous frame (A). By taking the median of those three signals, the "feedback" or "reference" signal (M) for the subtractor 106 is in a sense "pre-corrected" for moving pictures, which substantially reduces the motion artifacts previously discussed. The dramatic reduction in motion artifacts is illustrated in the spario-temporal diagram of FIG. 4.

Figure 4:
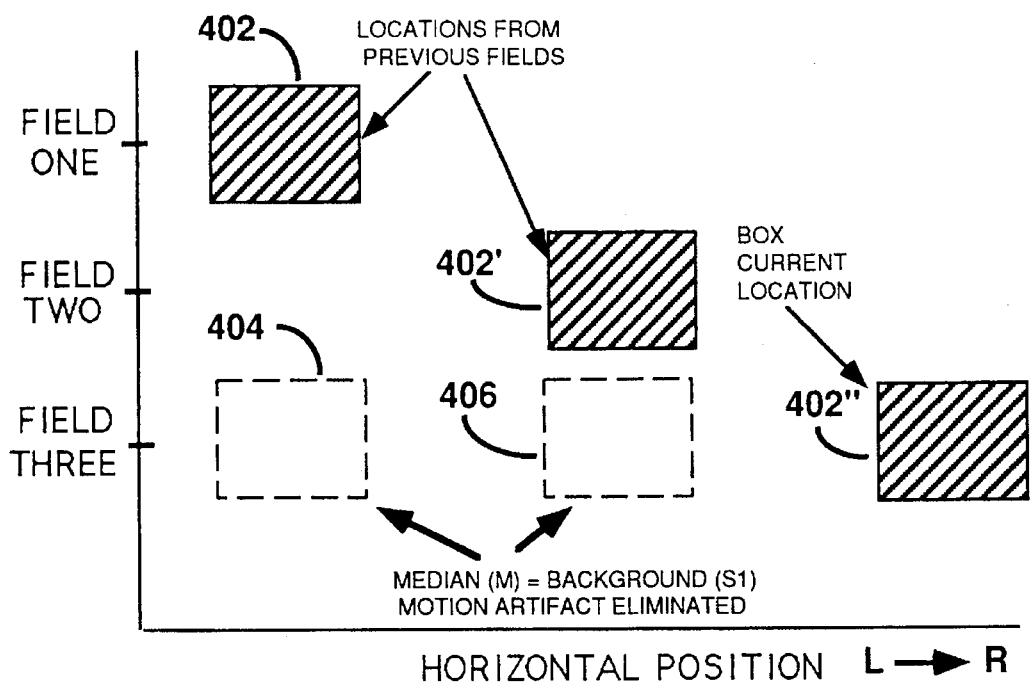
FIG. 4 is spatio-temporal diagram illustrating motion artifact suppression of the noise reduction portion of the system of FIG. 2.

In FIG. 4 the horizontal axis represents horizontal position from left to right and the vertical axis represents time in terms of three fields with field three being the current field, field two being the previous field and field one being a field occurring one frame earlier. There is illustrated a case where a dark box 402 is in motion from left to right across a light background during three fields. In field 1, box 402 is located to the left of the horizontal position axis. In field 2 the box 402' has moved to the center and in field 3 the box (402") has moved to the right.

Now consider the visual effects that would be perceived by a viewer who is watching the current field (field number three). If the video was processed by a conventional frame recursive IIR (infinite impulse response) filter, the displayed signal would include a visible artifact at location 404. This results because in conventional IIR noise reduction systems when motion is present the frame difference signal (i.e., the subtractor output) mainly represents motion (i.e., the difference between box 402 a frame earlier and location 404. Subtracting the black box 402 from the white background 404 would produce a very large value for the difference signal. Such a difference would clearly activate the limiter and the limiter output would still include a large motion dependent artifact. Also, due to the temporal recursion of the noise reduction, the motion artifact will die out slowly over several frames and the effect will be trailing a smear or ghosts behind the moving box.

Advantageously, under the identical circumstances described above, in the system of FIG. 2 the potential artifact of a large frame difference due to motion is completely eliminated in both of locations 404 and 406 of the displayed current field. Here's why. Recall that the three signals A, B and C are median filtered for application to the subtractor 106. As shown in FIG. 4, the box 402 from two fields away has a relatively low luminance value (e.g., black), the luminance one field previous was of background level (e.g., white) and so is the luminance of region 404 of the current field. Accordingly, for display location 404 of the current field, the median of the black box 402 of field one, the white background in field two and the white background in field three (at location 404) is white. In other words, for this case the median filter input comprises BLACK, WHITE and WHITE and the median equals WHITE. Since the current value of the video input signal at location 404 is also WHITE, the difference "D" between the median and the current is either zero or equal to the difference between fields two and three depending on the noise content of these two signals. Thus the output of the subtractor 106 is forced to be zero thereby avoiding the production of a visible artifact at location 404 for the moving box 402.

Advantageously, even for this operating condition, some noise reduction is applied. In terms of viewer preference, elimination of the potential motion artifact at location 404 has been found to dramatically improve the system performance. Moreover, it also suppresses a motion artifact at location 406 of the moving box 402.

In more detail, for display location 406 in the current field (field three), the inputs to the median filter 220 will be WHITE (i.e., the back ground of field one), BLACK (i.e., the box 402 itself in field two) and WHITE (i.e., the background level at center location 406 of field three). The median of WHITE/BLACK/WHITE is WHITE and so the output of the median filter will correspond to the white background level. But this level is also applied to subtractor 106 and so the difference signal "De" will be forced to be zero. This is true regardless of the actual level in IRE units as long as the level of the box a field ahead is different from the levels of the background preceding and following it. Accordingly, potential motion artifacts are eliminated at both the left location 404 and the center location 406 of the current field three which is being displayed for the continuously moving box.

At box location 402" the inputs to the median filter of WHITE, WHITE and BLACK from the corresponding locations of fields one, two and three will yield a median of WHITE but the current video input signal will be BLACK. Consequently, subtractor 106 will produce a maximum value difference signal "D". The limitation of the amplitude of signal "D" by limiter 108, when added in adder 112, will reduce the contrast of the moving box. It is herein recognized that in practical applications, the trailing smear associated with conventional noise reduction techniques is considered much more objectionable than an artifact on the moving object itself. This is due to the inherent psychovisual difficulty with resolving detail in moving objects.

Advantageously, the reduction of motion related artifacts discussed above for the system of FIG. 2 is achieved without resort to the conventional "blending" or "band-splitting" approaches previously discussed thereby avoiding their collective shortcomings.

FIG. 3 illustrates a suitable implementation of the median filter 220 for used in the motion adaptive video noise reduction system of FIG. 2. The filter may be constructed in either analog or digital form. The filter comprises three magnitude comparators 302, 304 and 306 which compare, respectively, signals AB, BC and CA. For analog implementations, the magnitude comparators may comprise differential amplifiers or analog voltage comparators. For digital implementation, the comparators may comprise conventional multi-bit binary magnitude comparators (for parallel processing) or single bit comparators (for serial arithmetic) A gate 308 provides the logical exclusive-OR of the outputs of magnitude comparators 302 and 304 for controlling a multiplex switch 312 which selects signals "A" or "B". Conventional exclusive OR gates may be used for this purpose in either analog or digital implementations. Another gate 310 provides the exclusive-OR of the outputs of comparators 304 and 306 for controlling a multiplex 314 which selects the output of switch 312 or signal "C" and produces the median "M" of signals "A", "B" and "C". For analog implementations the multiplex switches may comprise transmission gates, or the like, and for digital implementations they may comprise either transmission gate switches or AND/OR selection (binary) gates or the like.

In operation, exclusive-OR gate 310 determines if C is the median by enabling switch 314 to select C if either B>C and C>A or B<C and C<A. Otherwise switch 314 selects the output of switch 312. Exclusive -OR gate 308 controls switch 312 to select B as its output if either A>B and B>C or if A<B and B<C thereby identifying B as the median. Otherwise, switch 312 selects signal A as the median. Summarizing, briefly, C is selected as the median if within the range bounded by A and B, B is selected if within the range bounded by A and C and C is selected if within the range bounded by A and B. If two or more signals are of identical value, then that value will be outputted as the median value, "M".

What is claimed is:

1. Apparatus, for providing video noise reduction, comprising:

a subtractor for forming a difference signal from a video input signal and a further signal supplied thereto a circuit for limiting and attenuating said difference signal to form a resultant signal;

a combiner for combining the input and resultant signals to form a noise reduced video output signal;

a delay circuit, responsive to the video output signal, for providing a field delayed video signal and a frame delayed video signal; and a selection circuit for selecting one of the field delayed video signal, the frame delayed video signal and the video input signal as the further signal for application to the subtractor.

2. Apparatus, as recited in claim 1, wherein the selection circuit comprises a median filter to which the field delayed video signal, the frame delayed video signal and the video input signal are applied and the output of which is connected to supply the further signal to the subtractor.

3. Apparatus, as recited in claim 1, wherein the selection circuit comprises:

a switch; and a control circuit for causing the switch to select the video input signal as the further signal when the video input signal is within a range bounded by the two delayed signals;

said control circuit for causing the switch to select the field delayed video signal when the field delayed video signal is within a range bounded by the video input signal and the frame delayed video signal; and said control circuit for causing the switch to select the frame delayed video signal when the frame delayed video signal is within a range bounded by the video input signal and the field delayed video signal.

4. Apparatus, as recited in claim 1, wherein the delay circuit includes an interpolator for spatially aligning pixels of the field delayed video signal with pixels of the video input signal.

5. Apparatus, as recited in claim 1 wherein the delay circuit includes a two point linear interpolator for averaging pixels delayed by one field less one half line with pixels delayed by one field plus one half line to form said field delayed video signal.

6. A method of providing noise reduction, comprising:

forming a difference signal from a video input signal and a further signal;

limiting and attenuating the difference signal to form a resultant signal;

combining the resultant signal with the video input signal to form a video output signal;

delaying the video output signal by one field and by one frame; and selecting the further signal from among (i) the field delayed video output signal, (ii) the frame delayed video output signal and (iii) the video input signal.

7. A method, as recited in claiim 6, wherein the step of selecting the further signal comprises:

subjecting the video input signal, the field delayed video signal and the frame delayed video signal to median filtering to provide a median valued signal; and selecting the median valued signal as the further signal for forming the difference signal.

8. A method, as recited in claim 6, wherein the selection step comprises:

selecting the video input signal as the further signal when the video input signal is within a range bounded by the two delayed video signals;

selecting the field delayed video signal as the further signal when the field delayed video signal is within a range bounded by the video input signal and the frame delayed video signal; and selecting the frame delayed video signal as the further signal when the frame delayed video signal is within a range bounded by the video input signal and the field delayed video signal.

9. A method, as recited in claim 6, wherein the step of delaying the video output signal further includes interpolating the field delayed video signal for spatially aligning pixels of the field delayed video signal with pixels of the video input signal.

10. A method, as recited in claim 6, wherein the step of delaying the video output signal includes further includes interpolating the field delayed video signal by two-point linear interpolation including averaging pixels delayed by one field less one half line with pixels delayed by one field plus one half line to form said field delayed video signal.

11. Video noise reduction apparatus, comprising;

a subtractor having a first input for receiving a video input signal to be noise reduced, having a second input for receiving a further signal for facilitating the noise reduction and having an output for providing a difference signal;

a circuit for limiting and attenuating said difference signal to form a resultant signal;

a combiner, for combining said resultant signal with video input signal to form a noise reduced video output signal;

a delay unit having a input coupled to receive said noise reduced video output signal, having a first output for providing a field delayed video signal and having a second output for providing a frame delayed video signal; and a median filter for producing said further signal, said median filter having a first input coupled to said first input of said subtractor for receiving said video input signal, having a second input coupled to receive said field delayed video signal, having a third input coupled to receive said frame delayed video signal and having an output connected to said second input of said subtractor.

12. Apparatus as recited in claim 11 wherein said field delayed signal comprises an average of said video output signal delayed by one field less one-half line and said video output signal delayed by one field plus one-half line.

13. A method of providing video noise reduction, comprising:

forming a difference signal from a video input signal and a further signal;

limiting, attenuating and combining said difference signal with said video input signal to form a video output signal;

delaying the video output signal by one field and by one frame; and median filtering the field delayed video output signal, the frame delayed video output signal and the video input signal to produce said further signal.

14. A method as recited in claim 13 where the step of delaying the video output signal by a field comprises:

delaying the video output signal by a field less one-half line;

delaying the video output signal by a field plus one-half line; and averaging the two delayed signals.

\* \* \* \* \*